(No Model.)
W. M. DERBY.
LUBRICATOR.
No. 396,471. Patented Jan. 22, 1889.
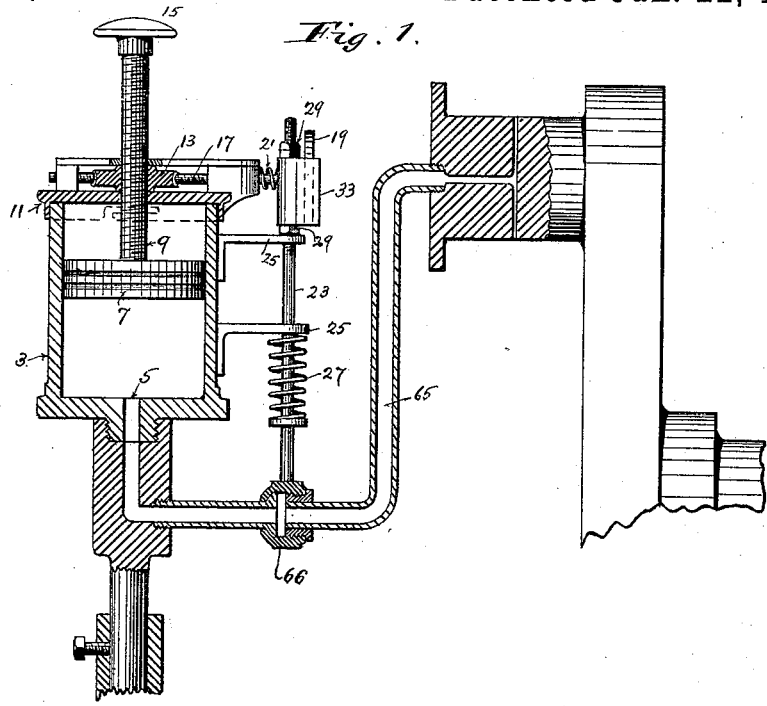
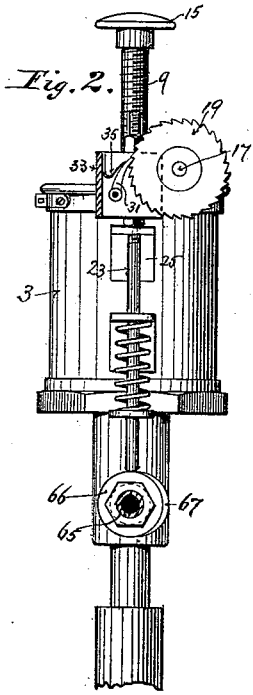
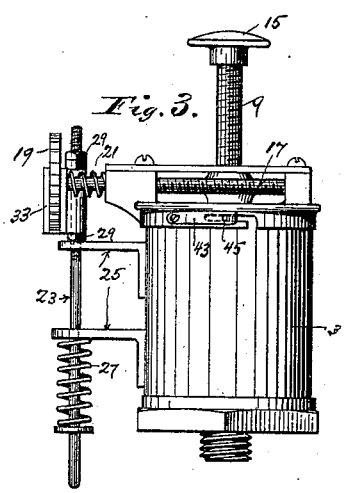
Witnesses.
J. Jessen
C. C. Nachtrieb
Inventor
Willis M. Derby
By O. C. Paul Atty.

UNITED STATES PATENT OFFICE.

WILLIS M. DERBY, OF MINNEAPOLIS, MINNESOTA.

LUBRICATOR.

SPECIFICATION forming part of Letters Patent No. 396,471, dated January 22, 1889.

Application filed April 8, 1886. Serial No. 198,190. (No model.)

*To all whom it may concern:*

Be it known that I, WILLIS M. DERBY, a citizen of the United States, and a resident of Minneapolis, in the county of Hennepin and State of Minnesota, have invented certain Improvements in Lubricators, of which the following is a specification.

My invention relates particularly to improvements in cups for feeding grease or oil to crank-pins of engines or other machinery; and the object I have in view is to provide means by which the grease or oil will be regularly and evenly discharged at all times from the cup.

In the accompanying drawings, forming a part of this specification, Figure 1 is a sectional elevation of a lubricator embodying my invention. Fig. 2 is a front elevation of the same. Fig. 3 is a side elevation of the cup.

In the drawings, 3 represents the cup or body of the lubricator. It may be of any suitable construction, and formed of metal, glass, or other suitable material. It is provided with a discharge-opening, 5, through which the lubricant is forced from the cup. Fitting closely within the cup is a piston or plunger, 7, that is secured to the lower end of a screw-threaded rod, 9. When used for feeding oil, the piston has suitable packing on its edge. The cup is provided with a suitable cap or cover, 11, that is held in place by bayonet-joints or other suitable means. A nut, 13, is mounted on the rod 9 and is held in position on the top of the cup. The rod 9 is provided with a hand-wheel, 15, by which it may be turned to adjust the piston relatively to the nut. The edge of the nut is formed into a worm-gear, which is engaged by a threaded rod, 17, that is mounted and turns in suitable bearings on the top of the cup. A ratchet-wheel, 19, is secured to this rod. A coiled spring, 21, bears against the inner face of the wheel and against the bearing in which the rod is mounted. This spring holds the wheel and keeps it from turning backward or turning forward, except when moved by its operating-pawl. A vertically-moving rod, 23, is secured in arms 25, that are preferably supported upon the cup. This rod is provided with a spring, 27, that tends to hold it down in position to be operated by a suitable cam, as hereinafter described. The upper end of the rod may be screw-threaded and provided with nuts 29, by which it may be adjusted to give a longer or shorter stroke.

The rod 23 carries a spring-pawl, 31, which moves the ratchet-wheel as the rod is raised. This pawl is preferably pivoted in a suitable block, 33, into the slot of which the ratchet-wheel projects. A spring, 35, engages the pawl and holds it against the ratchet-wheel.

The block 33 may be adjusted upon the rod 23 by means of the nuts 29 to any desired position thereon. The throw of the pawl, and therefore the amount that the ratchet will be moved each time the rod is raised, may be regulated by means of the nuts 29. Each time the rod 23 is raised the ratchet-wheel is turned and the rod 17 turns the nut 13. This nut turns on the piston-rod 9 and forces the piston down, thereby constantly and with equal pressure forcing the grease or oil from the cup. The friction between the piston and the walls of the cup is sufficient to keep the rod 9 from turning with the nut. The piston will gradually move down until all the grease is forced from the cup. This will be done even though the grease is very hard or has hard lumps in it, as great force may be exerted by the piston. When the cover is held on by a bayonet-joint, it may have a spring, 43, that engages the pin 45 of the joint and locks the cover in place.

In Figs. 1 and 2 I have shown the manner of applying my cup to a crank-pin. The cup is mounted upon a suitable support, and the exit-pipe from the cup is coupled by a suitable joint, 66, to a pipe, 65, that extends to the crank-pin. This joint 66 is concentric with the axis of the crank, and the pipe 65 turns with the crank. A suitable cam, 67, as shown in Fig. 2, turns with the pipe 65 and at each revolution of the crank raises the operating-rod of the cup. The grease or oil is forced outward through the exit-pipe of the cup and through the pipe 65 to the crank-pin.

I claim as my invention—

The combination, with the lubricating-cup, of the piston arranged therein, the pipe connected to the crank-pin and jointed to the exit-pipe of the lubricator, the operating-rod, and connecting mechanism between said operating-rod and said piston, whereby the crank-pin may be lubricated, as described.

In testimony whereof I have hereunto set my hand this 1st day of April, 1886.

WILLIS M. DERBY.

In presence of—
A. C. PAUL,
RICHARD PAUL.